Sept. 3, 1935.  S. G. FRANTZ  2,013,094

METHOD OF CONTROLLING THE FLOW OF ELECTRONS

Original Filed May 22, 1930  4 Sheets-Sheet 1

INVENTOR
SAMUEL G. FRANTZ
BY
ATTORNEY

Sept. 3, 1935.  S. G. FRANTZ  2,013,094
METHOD OF CONTROLLING THE FLOW OF ELECTRONS
Original Filed May 22, 1930  4 Sheets-Sheet 2

INVENTOR
SAMUEL G. FRANTZ
BY
ATTORNEY

Sept. 3, 1935.  S. G. FRANTZ  2,013,094
METHOD OF CONTROLLING THE FLOW OF ELECTRONS
Original Filed May 22, 1930  4 Sheets-Sheet 4
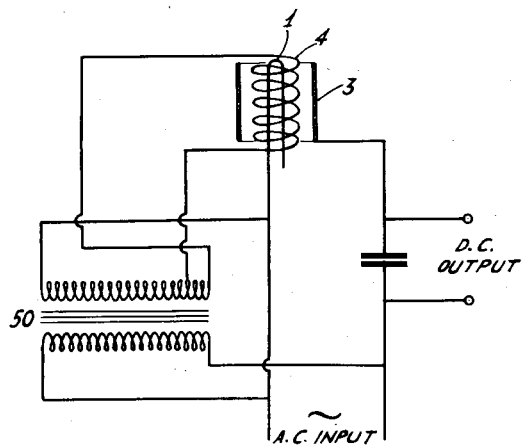
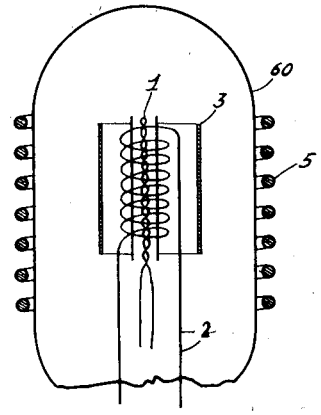
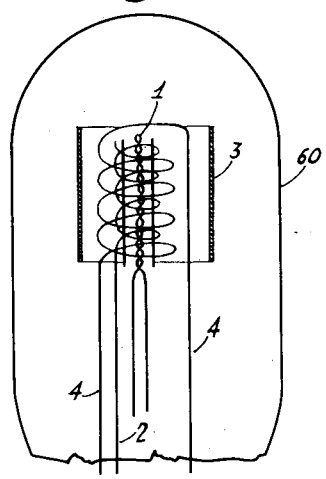
INVENTOR
SAMUEL G. FRANTZ
BY
ATTORNEY Patented Sept. 3, 1935

2,013,094

UNITED STATES PATENT OFFICE 2,013,094

METHOD OF CONTROLLING THE FLOW OF ELECTRONS

Samuel G. Frantz, Princeton, N. J., assignor to Radio Corporation of America, a corporation of Delaware Original application May 22, 1930, Serial No. 454,533. Divided and this application May 22, 1930, Serial No. 454,532

13 Claims. (Cl. 175—363)

This invention relates to electron discharge devices and more particularly to a method of controlling the flow of electrons.

This application is a division of application Serial No. 454,533, filed the same date.

The invention comprises a novel method of, and means for, controlling the flow of electrons in an electron discharge device, and depends upon the proposition that a current flowing through a conductor produces a magnetic field around the conductor, and also that an electron in motion is similar to current flow in a conductor. If a conductor is positioned in an electron discharge device and carries current, the magnetic field around the conductor will tend to deflect or control the electronic flow in the discharge device. These phenomena are utilized by the invention in several forms; for example, current is made to flow through the grid of a thermionic valve, and the magnetic field produced by this current is utilized to deflect electrons traveling from the cathode toward the anode. The necessity for negative grid bias for the grid is thereby eliminated.

In another aspect of the invention, these phenomena relating to magnetic fields may be utilized for the reduction of heat losses in thermionic valves and high power rectifiers, and in avoiding the effect, often objectionable, of secondary emission from the anode or electron collector. In my arrangement, an auxiliary electrode is positioned close to the plate or electron collector, and current is passed through this auxiliary electrode; at the same time a high potential is supplied to this auxiliary electrode to accelerate the flow of electrons from the cathode toward the auxiliary electrode. The magnetic field created by the current flowing in the auxiliary electrode will deflect the electrons to an extent sufficient to repel them from the auxiliary electrode, and at the same time the high velocity of the electrons accelerated by the high positive potential of the auxiliary electrode will be sufficient to bring the electrons to the anode or electron collector.

Other aspects of the invention will appear further in the specification.

The invention will be more clearly understood with the aid of the accompanying drawings.

Figure 18 shows the schematic wiring diagram of still another form of half-wave rectifier constructed according to my invention.

Figure 19 shows schematically an indirectly-heated vacuum tube according to my invention.

Figure 20 shows a tube similar to that of Figure 18 wherein the accelerating electrode is positioned within the tube.

In ordinary three electrode tubes, the three electrodes comprise a hot electron-emitter or cathode, a cold electron-collector or anode, and an input or control electrode known as the grid. When the cathode is heated sufficiently and when a proper potential difference is applied between the anode and the cathode, electrons will flow from the cathode to the anode, as is well known. The control electrode or grid is impressed with the control voltages to affect the flow of electrons from the cathode to the anode, or in other words, to control the flow of current from the anode to the cathode. Since the control electrode is usually positioned between the cathode and the anode, and since the control grid would normally be positive sometimes with respect to the cathode, some of the electrons flowing from the cathode to the anode will be attracted to the control electrode. This flow of electrons to and through the control electrode has given rise to several difficulties, and many attempts have been made to eliminate or reduce this flow. The common method is to apply to the control grid a potential or bias which is negative with respect to the cathode. This tends to reduce or eliminate the attraction which the control grid has for the electrons flowing from the cathode. This, however, does not entirely eliminate the flow of electrons to and through the grid, because notwithstanding this negative bias, the fluctuations in control voltages make the control electrode more positive at times than the negative biasing potential applied to it, and this reduces or neutralizes the repulsion which the control grid should exert on the electrons. Too much grid bias will stop operation of the tube. Moreover, the position of the control grid between the cathode and the anode subjects the control grid to bombardment by the electrons, and many of them enter the control electrode.

I have found that I can exert a greater repulsion on the electrons tending to enter the grid than has heretofore been accomplished by the negative grid biasing potential.

Figure 1:
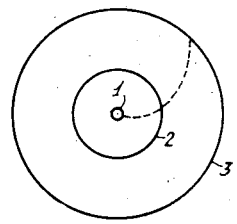
Figure 1 represents a schematic showing of a simple form of my invention as applied to the ordinary three electrode vacuum tube.

A simple form of my apparatus is illustrated in Figure 1 which shows a three electrode tube adapted to the purposes of my invention. In this figure, the cathode or filament 1 is shown as a straight wire, although it is obvious that it may be the hairpin type or cylindrical type of filament or the indirectly heated cathode type. Surrounding the cathode 1 is the control electrode or grid 2, which is here shown schematically as a helix, although it may have other forms, the main requisite being that the elements of the grid be spaced apart to permit the electrons to pass through the grid on their way to the electron collector or anode 3. This anode is shown as a cylinder concentric with the cathode 1 and the grid 2, although it is apparent that it may have other forms, and may comprise a plate, a wire, or any combination of these. Enclosing the whole may be an envelope of glass or metal.

During operation of the tube, the cathode 1 is heated to emit electrons, and the potential of the anode 3 is such as to attract the electrons. The grid 2 is impressed with the signal voltages to control the number of electrons passing through to the anode 3. This is the usual process of operating the tube. In addition, I pass a current through the grid 2 during the operation of the tube. As is well known, a wire which carries current produces lines of force around it, the direction of which may be determined by the right hand rule. The control grid 2, therefore, will at all times during operation have a magnetic field which will have a direction perpendicular to the plane of the figure. As the electrons approach the grid 2 on their way to the anode 3 which attracts them, the magnetic field produced by the guard current in the grid 2 will exert a repelling effect on the electrons. The electrons will consequently be induced to take the path shown by the broken line in the figure. The path will approximate the shape of a spiral, the degree of which will depend on the voltage difference between the cathode and the anode and on the force of the magnetic field produced by the guard current in the grid 2. The magnetic field and the current which produces it will not affect the electron emitting tendencies of the cathode, but on the other hand the input voltages on the control electrode 2 will act in the normal manner to control the flow of electrons, and the anode will act in the usual manner to attract the electrons in its vicinity. The grid 2, however, will not receive electrons because the local magnetic field in the immediate vicinity of the grid wires will repel the electrons. My device, therefore, will be such as to eliminate or substantially reduce the flow of electrons in the control grid and this will be accomplished without the aid of the grid biasing potential.

Figure 2:
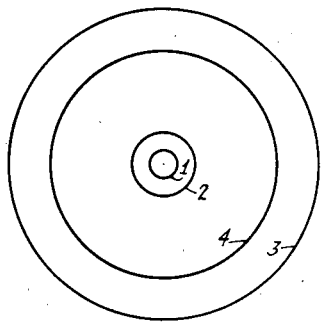
Figure 2 represents a schematic showing of another form of my invention, in which an additional electrode is employed to accelerate the electrons.

Figure 2 shows another form of my invention in which an additional electrode is employed to accelerate the electrons from the cathode to the anode. In this figure, the cathode 1 is shown schematically as a cylinder, although as pointed out in connection with Figure 1, it may have other forms and shapes. Surrounding the cathode 1 is the control grid 2, and surrounding the control grid 2 is the electron collector or anode 3. Positioned between the grid 2 and the anode 3 is an additional electrode 4 which acts to accelerate the flow of electrons from the cathode 1 to the anode 3. The electrode 4 is given a high potential to attract the electrons from the cathode 1 and this potential is so high that the momentum attained by the electrons will be sufficient to cause them to pass through the accelerating electrode 4 and strike the anode 3, even though the potential of the anode be less than that of the accelerating electrode 4. This will permit the use of lower plate potentials. In addition, the accelerating electrode 4 may carry a guard current which induces a magnetic field to prevent the electrons from entering it. If desired, the control grid 2 may also have a guard current traversing it to prevent any of the electrons from entering it, or both the grid 2 and the accelerating electrode 4 may have guard currents.

The device of Figure 2 is illustrated as a three electrode valve, although my invention is equally applicable to two electrode rectifiers, to four electrode tubes, commonly called the screen grid tubes, to pentodes, or any other form of device in which an anode is employed to receive or collect electrons. My invention is especially adapted to power tubes, where it is desired to get large output of current from the anode. In order to obtain such an output, it is necessary to provide a strong electro-static field within the tube to accelerate electrons leaving the cathode, and to remove them quickly from the space between the cathode and the anode. If they are not so removed, or if the electrons move slowly, the space between the cathode and anode contains so many electrons that electronic emission from the cathode is impeded. This is known as the space charge effect and is usually very undesirable.

In the ordinary tube, the anode may be said to have two functions. The first is to provide the necessary accelerating electro-static field by acting as the high potential plate of a condenser, the other plate being the cathode. The second function is to act as the receiving electrode which collects the electrons so that they may be removed from the tube as current through a wire provided for the purpose. In the ordinary tube, the combining of these two functions results in the following two serious disadvantages: The anode is bombarded by high velocity electrons accelerated by the high potential of the anode, and the kinetic energy of these electrons appears in the anode as heat. In power tubes the limit of power capacity is determined by the ability of the anode to dissipate this heat. Among the methods adopted to dissipate this heat are water-cooling, air-cooling, oil-cooling, large surface for the anode, and others. The second undesirable result is the electrical power loss in the circuit, which loss is equal to EI. That is, some of the power which might ideally appear in the output circuit is lost so far as useful work is concerned. This power loss, EI, is the potential difference E between the cathode and the anode, times the electron current I between the cathode and the anode. This energy represents the kinetic energy given to the electrons which finally appears in the anode in the form of heat and is entirely lost so far as useful work is concerned.

In one aspect of my invention, I separate the two functions of the anode. For example, in the device illustrated in Figure 2, the anode is used solely as the electron collector, and to accelerate the electrons I provide the additional electrode 4 which is kept at a high potential to attract the electrons. The anode 3, therefore, need not be kept at a very high potential; in fact, it may be kept at a much lower potential than the auxiliary accelerating electrode, and acts to receive most of the electrons which have been discharged from the cathode. Instead of passing a guard current through the accelerating auxiliary electrode to prevent it from receiving electrons emitted by the cathode, the same purpose may be achieved by a suitable geometrical design of the accelerating electrode and the other elements of the tube. In such a case, the electrons are given such a path as to avoid directly striking the auxiliary electrode 4, although the electro-static potential of this accelerating electrode acts to attract the electrons from the cathode.

Figure 3:
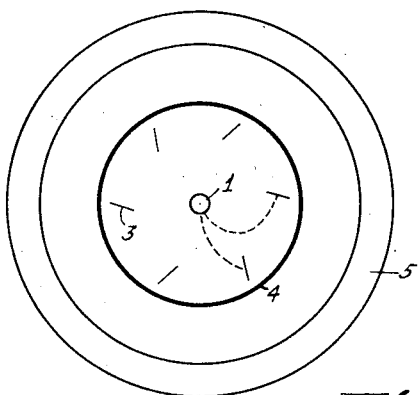
Figure 3 is a schematic showing of a modification of my invention, in which the magnetic field for deflecting the electrons is produced by a solenoid external to the tube.
Figure 4:
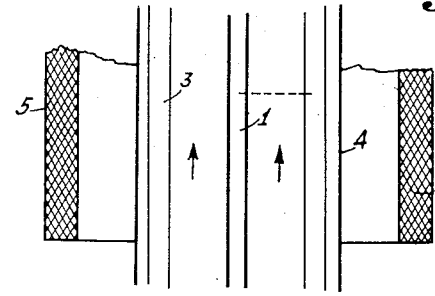
Figure 4 shows another view of the structure of Figure 3.

In Figures 3 and 4 is illustrated one form of my device in which the accelerating electrode does not carry current. Here the cathode 1 is illustrated as a straight filament, although it is obvious that a hairpin or helical filament or indirectly heated cathode may be employed. The anode or electron receiving electrode 3 is shown here diagrammatically as straight vanes, although it is obvious that other forms may be used, and in fact it is necessary only that the anode be appropriately apertured, as will hereafter appear. The accelerating electrode 4 is in the form of a cylinder surrounding the anode 3, although it is apparent that the accelerating electrode 4 may have other forms to suit the appropriate design. In this modification, the external solenoid 5 surrounding the accelerating electrode 4 is used to produce the magnetic field, which in this instance will act axially in the direction shown by the arrows. The electrons emitted by the cathode 1 will be directed toward the accelerating electrode 4 on account of the latter's high potential, but the magnetic field produced by the external solenoid 5 will be just sufficient to deflect the electrons so that they strike the face of the anode or electron collecting electrode 3. The path of the electrons is shown by the broken lines in Figures 3 and 4.

Figure 5:
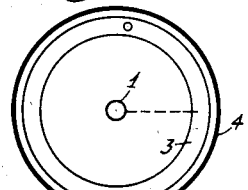
Figure 5 represents the schematic showing of another form of my invention, in which the magnetic field for deflecting the electrons is produced by current flowing in the central electrode of the electron discharge device.
Figure 6:
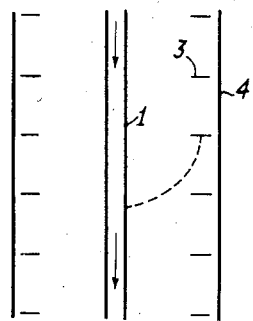
Figure 6 shows another view of the structure illustrated in Figure 5.

In another modification illustrated in Figures 5 and 6, the cathode 1 is utilized as the generator of the magnetic field by passing current through it or an adjacent wire, and the magnetic field will deflect the electrons so that they strike the anode 3 rather than the accelerating electrode 4. The path of the electrons is illustrated by the broken lines in Figures 5 and 6.

Figure 7:
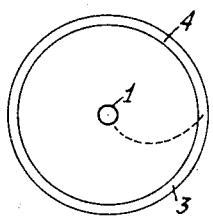
Figure 7 shows another form of my invention in which the accelerating electrode itself carries the current for producing the magnetic field which deflects the electrons.
Figure 8:
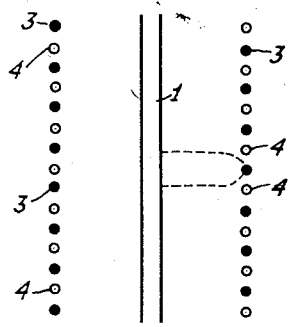
Figure 8 shows another view of the structure illustrated in Figure 7.

In another modification of my invention, the accelerating electrode itself carries current which produces all or part of the magnetic field to deflect the electrons. One form of this modification is shown in Figures 7 and 8. Here 1 is the cathode, as before; 4 is the high potential accelerating electrode; and 3 is the anode or electron receiving electrode. The anode 3 and the accelerating electrode 4 are given the form of intermeshing helices of the same diameter and concentrically positioned about the cathode 1. The accelerating electrode 4 is made to carry a current counter-clockwise (as shown in Figure 7), and the anode 3 is made to carry current clockwise, the current in 4 being greater than the current in 3. The magnetic field between the cathode 1 and the intermeshing helices will therefore be up (as shown in Figure 8). As the electrons leave the cathode 1 and flow toward the anode 3, they will receive a tangential component of velocity in a counter-clockwise direction, substantially horizontal as viewed in Figure 8, until they approach the helices. Near the wires 4 and 3, the magnetic field will exert a vertical force on the electrons having counter-clockwise movement and tend to move them away from 4 toward 3, as shown by the broken lines in Figure 8. The electrode 4 will thereby act only as an accelerating electrode, without receiving any of the electrons which it is desired that the anode 3 receive.

Figure 9:
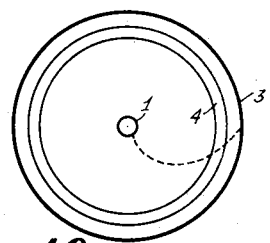
Figure 9 shows schematically another form of my invention similar to that of Figures 7 and 8 except that in Figure 9 the accelerating electrode which carries the current is positioned within the anode or electron collector.
Figure 10:
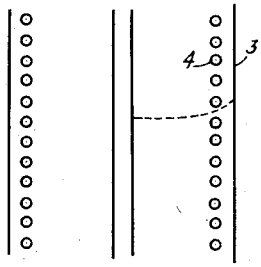
Figure 10 is another view of the structure illustrated in Figure 9.

In another form of this modification, illustrated in Figures 9 and 10, the device is made in the form of the usual three electrode tube, with the addition of a helix 4 which acts as the accelerating electrode. As shown, this helix 4 is positioned relatively close to the anode 3. Current is passed through the accelerating electrode 4, as above discussed, and the electrons in their path from the cathode 1 to the anode 3 will receive a counter-clockwise velocity as shown in Figure 9. The current flow in the accelerating electrode 4 is counter-clockwise, as before, and the magnetic field induced by this current will tend to deflect the electrons in their path before they reach the helix 4 as shown in Figure 10. This deflection will be sufficient to cause the electrons to pass in through the interstices of the helix 4 and collect on the anode 3. As is obvious, the anode 3 may be in other forms than a cylinder and may be in the form of a flattened oval or a flat plate, the accelerating electrode 4 being correspondingly formed to be positioned close to the anode 3.

Since the anode 3 may be at a potential only slightly above that of the cathode 1, in contradistinction to the very high potentials used in the present tubes, the kinetic energy of the received electrons in my device is small on account of the relatively low velocity of the electrons as they strike the anode 3. The heating of the anode is therefore small and the power capacity of my tube will be relatively great. At the same time the power loss, which as above discussed is equal to EI, is small, and my tube is therefore highly efficient.

Figure 11:
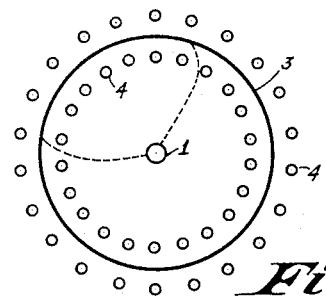
Figure 11 shows schematically another modification in which the accelerating electrode which carries the deflecting current is positioned entirely around the anode or electron collector and takes the form of a flattened tube in cross section.
Figure 12:
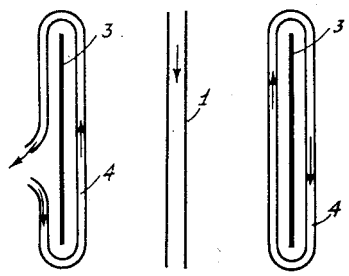
Figure 12 shows another view of the structure illustrated in Figure 11.

Figures 11 and 12 illustrate another modification of my invention in which the accelerating electrode 4 is given the form of a hollow member surrounding the anode 3. Current is sent up through the accelerating electrode 4 within the anode 3 as shown by the arrows in Figure 12, and current is sent down through the cathode 1. The magnetic field resulting from the current in the accelerating electrode 4 and the current in the cathode 1 will be such as to deflect the electrons away from the wires of the accelerating electrode 4 just before they reach the accelerating electrode 4 on their way to the anode 3. In any of these constructions a control grid 2 may be added outside the cathode 1.

Figure 13:
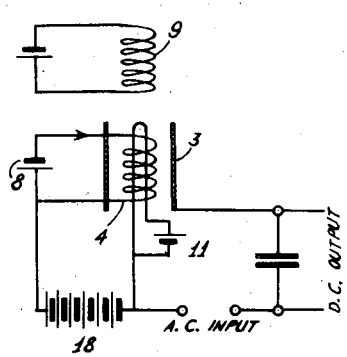
Figure 13 shows my invention as applied to a half wave rectifier circuit.

Figure 13 represents a rectifier circuit in which a half-wave tube is used, that is, a tube which rectifies one half of the cycle. The anode is shown at 3. The cathode 1 is energized from the source 11. At 4 is the accelerating electrode through which is passed a current from the source 8. A coil 9 may produce an auxiliary magnetic field to help deflect the electrons from the accelerating electrode. This coil 9 may be either within or without the tube. The battery 18 produces the high potential of the accelerating electrode 4. My invention is peculiarly applicable to rectifier circuits because it increases the power capacity of the tube, reduces heating of the anode, and permits lower operating potential of the anode, as previously set forth.

Figure 14:
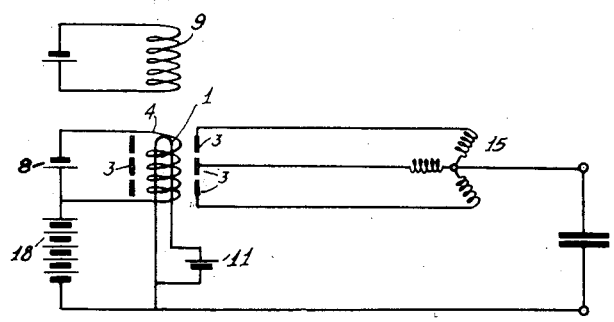
Figure 14 shows a schematic wiring diagram of my invention as applied to a three phase rectifier circuit.

Figure 14 shows another modification of my invention which consists of a rectifier circuit for a three phase line. In this figure a tube having three anodes is used. A three phase transformer 15 is connected to the alternating current lines and is connected to the anodes 3. The cathode 1 is energized by the source of current 11, as in the rectifier circuit previously described. An accelerating electrode 4 is positioned about the cathode 1 and between the cathode 1 and the anode 3 and serves as previously set forth. A coil 9 for producing an additional magnetic field may be positioned within the tube or without the tube as set forth previously.

Figure 15:
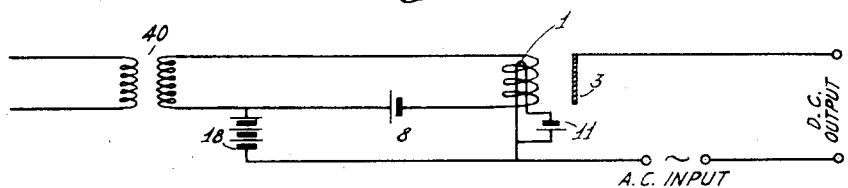
Figure 15 shows a schematic wiring diagram of another form of rectifier constructed according to my invention.

Figure 15 shows another rectifier circuit. In this modification, the accelerating electrode 4 carries current which is supplied to it by means of the transformer 40 from a source of alternating current potential, preferably that of the alternating current to be rectified. If desired, battery 8 may supply direct current to the electrode 4.

Figure 16:
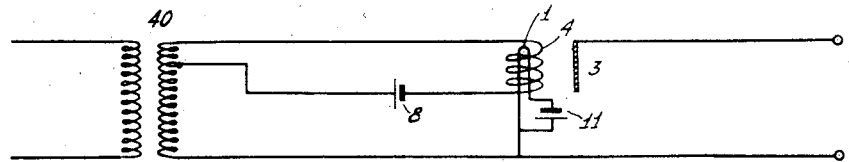
Figure 16 shows the schematic wiring diagram of an amplifier constructed according to my invention.

Figure 16 shows a circuit in which my tube is employed as an amplifier. The transformer 40 transfers the incoming signal to the tube. The accelerating electrode 4 is tapped to one of the windings of the secondary of the transformer 40 and consequently carries current to produce the magnetic field. The accelerating electrode 4 is made to act as the control electrode at the same time. If desired, battery 8 may supply direct current to the electrode 4.

Figure 17:
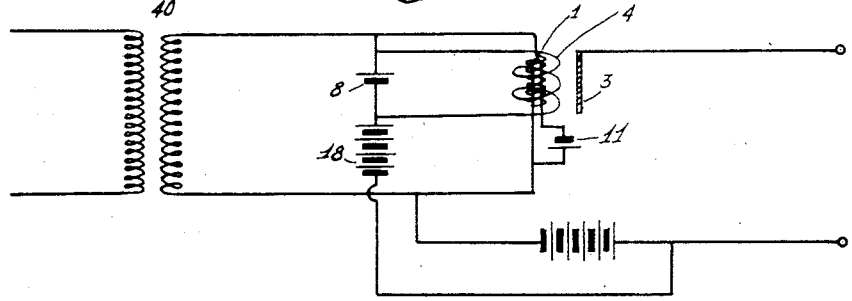
Figure 17 shows the schematic wiring diagram of another form of amplifier which contains an accelerating electrode and is constructed according to my invention.

Figure 17 shows another form of amplifier circuit. Here the accelerating electrode 4 is supplied with direct current from the cell or battery 8. The control grid is shown at 2.

Figure 18 shows another form of circuit for a half wave rectifier. In this modification, the guard current and the accelerating potential are supplied by means of a transformer 50 from the source of alternating current potential which is to be rectified.

Figure 19 shows one form of my tube in which the solenoid 5 is placed outside the glass envelope 60. The control grid 2 has the input potential impressed thereon and a guard current is passed through it in the same direction as that in the solenoid 5.

Figure 20 shows another form of my tube in which the accelerating electrode 4 is positioned within the anode 3. A guard current may be passed through the accelerating electrode 4, or through the control grid 2, or through both the control grid 2 and the accelerating electrode 4. Here, as in Figure 21, the various electrodes may have other forms and shapes than those illustrated.

Not only does my invention reduce the power loss and the heating of the tube but it also reduces the mechanical disintegration of the anode due to the high velocity of the electrons as they strike the anode in the ordinary construction. As is well-known, this disintegration affects the operating characteristics of the tube and in time renders the tube inoperative for its purposes. My invention increases the power capacity of the tube, avoids disintegration of the anode, reduces the heating of the anode, avoids expensive and cumbersome cooling means for the anode, avoids the disadvantages of negative grid bias, and in general results in a highly efficient tube.

I wish it to be understood that the forms shown in this application are merely illustrative and not definitive, it being apparent that changes may be made in the proportions, shapes, and designs to suit various desired operating conditions.

What I claim is:

1. The method of rectifying alternating current by an electron emitting cathode and an electron collecting electrode at a positive potential, which comprises applying to a conductor interposed between said electrodes a positive potential higher than that of said collecting electrode and passing current through said conductor to create around it a magnetic field which deflects electrons from said conductor, but permits the electrons to reach said collecting electrode.

2. The method of controlling the flow of electrons from a cathode thru a grid electrode to a plate at positive potential which comprises maintaining said grid electrode at a constant positive potential higher than that of said plate, and creating a magnetic field of such strength and direction around said grid only that electrons are deflected from said grid but pass on and reach said plate.

3. The method of controlling the flow of electrons from an electron source which comprises accelerating the electrons by an element charged to a constant positive potential, deflecting said electrons from said element by a magnetic field, and collecting the deflected electrons by a second element charged to a lower positive potential.

4. The method of controlling the flow of electrons from an electron source which comprises passing the electrons thru a control grid adjacent said source, and on through an accelerating grid to a positive plate, maintaining on said accelerating grid a higher constant positive potential than on said plate, and passing current through said accelerating grid to create a magnetic field of such strength and direction as to deflect the electrons from said accelerating grid.

5. The method of controlling the flow of electrons from an electron source which comprises influencing the electron flow by a charged conductor adjacent said source, accelerating said electron flow by a second conductor maintained at a high and constant positive potential, deflecting the electrons from said second conductor by a magnetic field, and collecting said electrons by a plate maintained at a positive potential lower than that of said second conductor.

6. The method of operating an electron discharge device comprising an electron emitting cathode, a plate, and a third electrode which consists in producing an emission of electrons from said cathode, applying to said third electrode a positive potential higher than that of said plate to cause electrons to move toward said third electrode and said plate, and subjecting said moving electrons to the action of a magnetic field in such a way that they are deflected to said plate and produce a given plate current which heats said plate less than an equal plate current produced by positive potential on the plate when the magnetic field is absent and said third electrode is exerting a negligible effect on said electrons.

7. The method of operating an electron discharge device comprising an electron emitting cathode, a plate, and a grid like accelerating electrode which consists in producing an emission of electrons from said cathode, applying to said accelerating electrode a potential more positive than that of said plate to draw electrons toward said electrode and plate, and subjecting said electrons to the action of a magnetic field adjacent said accelerating electrode and of such strength and direction as to cause said electrons to produce a plate current which heats said plate less than an equal plate current obtained when the potential on said accelerating electrode is of negligible effect.

8. The method of controlling a flow of electrons from an electron source to a cooperating anode which comprises accelerating the flow of electrons toward said anode by an accelerating electrode of higher positive potential than said anode and comprising a conductor interposed between said electron source and said anode in position to be passed by said flow of electrons and establishing through said conductor a current to create around said conductor a magnetic field which deflects from said conductor electrons passing from said source to said anode.

9. The method of controlling an electron stream from a thermionic cathode to a cooperating anode which comprises accelerating an electron stream from said cathode to said anode by an interposed accelerating electrode passed by said electron stream and at a positive potential higher than said anode, and creating a magnetic field limited in effect to the immediate vicinity of said accelerating electrode to deflect said electron stream from said accelerating electrode whereby the anode current heats said anode less than an equal anode current produced when said magnetic field is absent and said accelerating electrode exerts a negligible effect on said electron stream.

10. The method of rectifying alternating current by a thermionic cathode and a cooperating anode which comprises producing an electron stream from said cathode to said anode, accelerating said electron stream toward said anode by an interposed accelerating electrode more positive than said anode and positioned to be passed by said electron stream, and creating a field which in effect surrounds only said accelerating electrode and deflects from said accelerating electrode said electron stream flowing past said accelerating electrode to said anode.

11. The method of rectifying alternating current by an electron emitting cathode, a cooperating anode and a perforated accelerating electrode interposed between said cathode and said anode which comprises creating a deflecting field which in effect surrounds only said accelerating electrode and deflects from said accelerating electrode an electron stream which flows from said cathode past said accelerating electrode to said anode, and applying to said accelerating electrode a positive potential higher than that of said anode to produce an anode current which heats said anode less than an equal anode current produced when said deflecting field is absent and said accelerating electrode exerts substantially no effect on said electrode stream.

12. The method of controlling an electron stream from a thermionic cathode which comprises passing the electron stream through two grids in succession to a positive plate, maintaining on one of said grids a constant positive potential higher than that of said plate for accelerating the flow of electrons, creating a magnetic field of such strength and direction around said accelerating grid only that the electron stream is deflected from said accelerating grid but passes through it and produces at the plate a plate current which heats said plate less than an equal plate current produced by positive potential on said plate when said accelerating grid exerts a negligible effect on the electron stream, and controlling the electron stream by the other grid.

13. The method of controlling an electron stream from a thermionic cathode which comprises passing the electron stream thru an accelerating grid comprising a helically wound conductor and thru another grid to a positive plate, maintaining all of the helically wound conductors at a uniform positive potential relative to the cathode and higher than that of said plate to accelerate the electron stream, passing current thru the helically wound conductor to create around said accelerating grid a magnetic field which deflects the electron stream from the conductors and permits the stream to pass thru the accelerating grid to the plate and produce a plate current which heats said plate less than an equal plate current produced by positive potential on said plate when said accelerating grid exerts a negligible effect on the electron stream, and controlling the electron stream by the other grid.

SAMUEL G. FRANTZ.